(12) United States Patent
Ozawa

(10) Patent No.: US 8,368,937 B2
(45) Date of Patent: Feb. 5, 2013

(54) PRINT DATA PROCESSING APPARATUS, PRINT DATA PROCESSING METHOD, AND STORAGE MEDIUM

(75) Inventor: Shuji Ozawa, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 12/887,033

(22) Filed: Sep. 21, 2010

(65) Prior Publication Data

US 2011/0069349 A1 Mar. 24, 2011

(30) Foreign Application Priority Data

Sep. 24, 2009 (JP) ................................. 2009-219222

(51) Int. Cl.
*G06F 3/12* (2006.01)
(52) U.S. Cl. .................... 358/1.15; 358/1.13; 710/15
(58) Field of Classification Search ................. 358/1.14, 358/1.15
See application file for complete search history.

(56) References Cited

U.S. PATENT DOCUMENTS

| | | | | |
|---|---|---|---|---|
| 7,032,099 | B1 * | 4/2006 | Imamura | 712/29 |
| 2002/0007448 | A1 * | 1/2002 | Matsuda | 712/1 |
| 2006/0288299 | A1 * | 12/2006 | Bystricky et al. | 715/744 |
| 2008/0137135 | A1 * | 6/2008 | Takeishi | 358/1.15 |

FOREIGN PATENT DOCUMENTS

JP 2007-152623 A 6/2007

* cited by examiner

*Primary Examiner* — Marivelisse Santiago Cordero
*Assistant Examiner* — Moustapha Diaby
(74) *Attorney, Agent, or Firm* — Canon U.S.A., Inc. IP Division

(57) ABSTRACT

A print data processing apparatus includes a first processor configured to read print data and perform print data processing on the read print data, and a second processor which operates in parallel with the first processor and is configured to stop the print data processing if an instruction to wait is input during the print data processing, to execute processing different from the print data processing if an instruction to execute the different processing is issued by the time the wait is released, and to execute the print data processing if the wait is released.

6 Claims, 15 Drawing Sheets

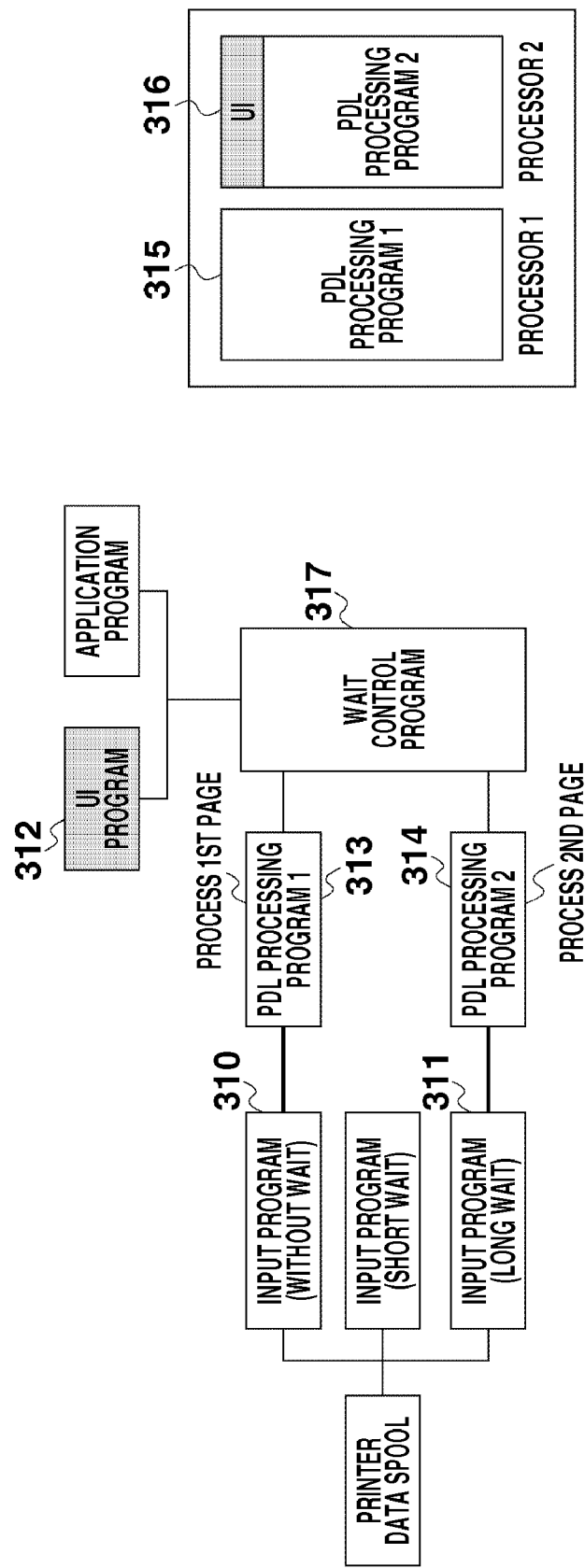

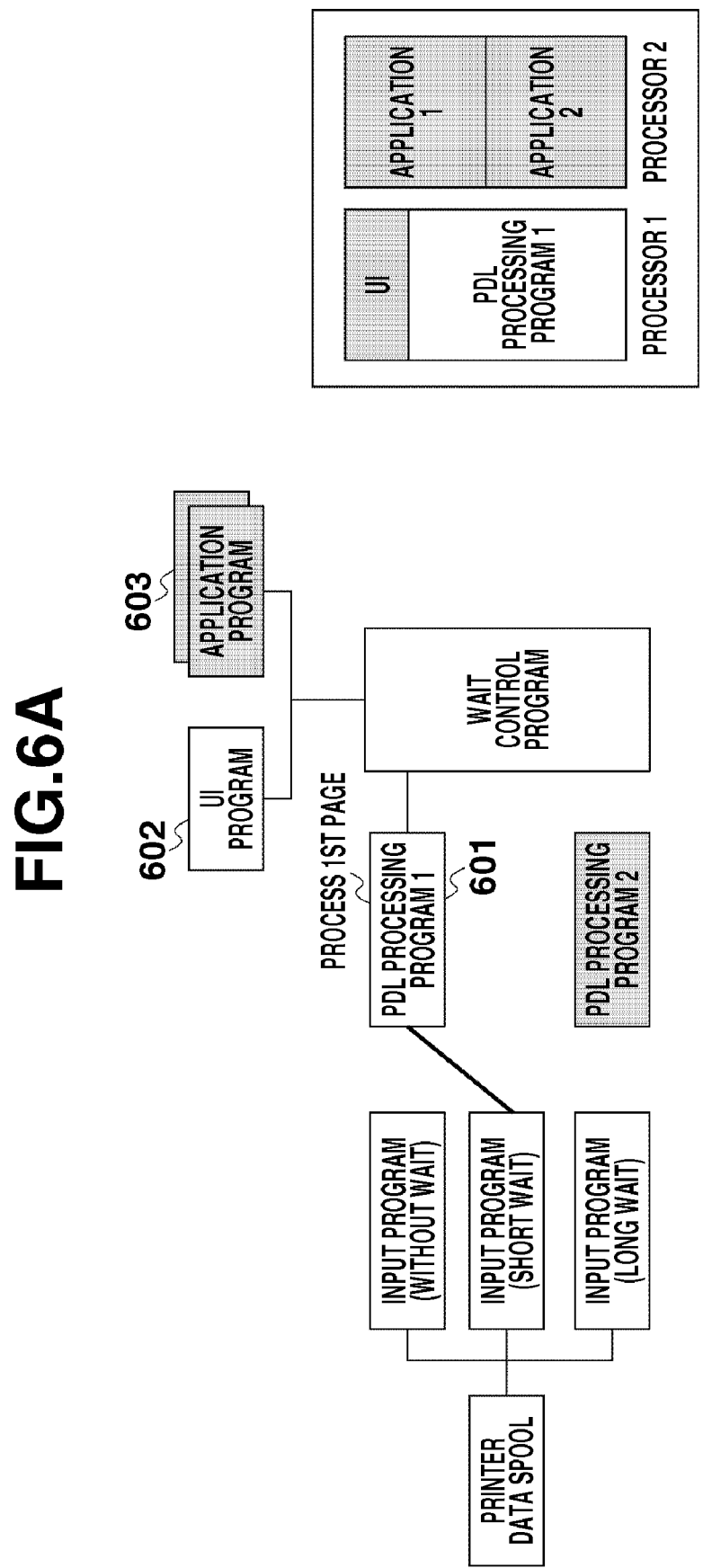

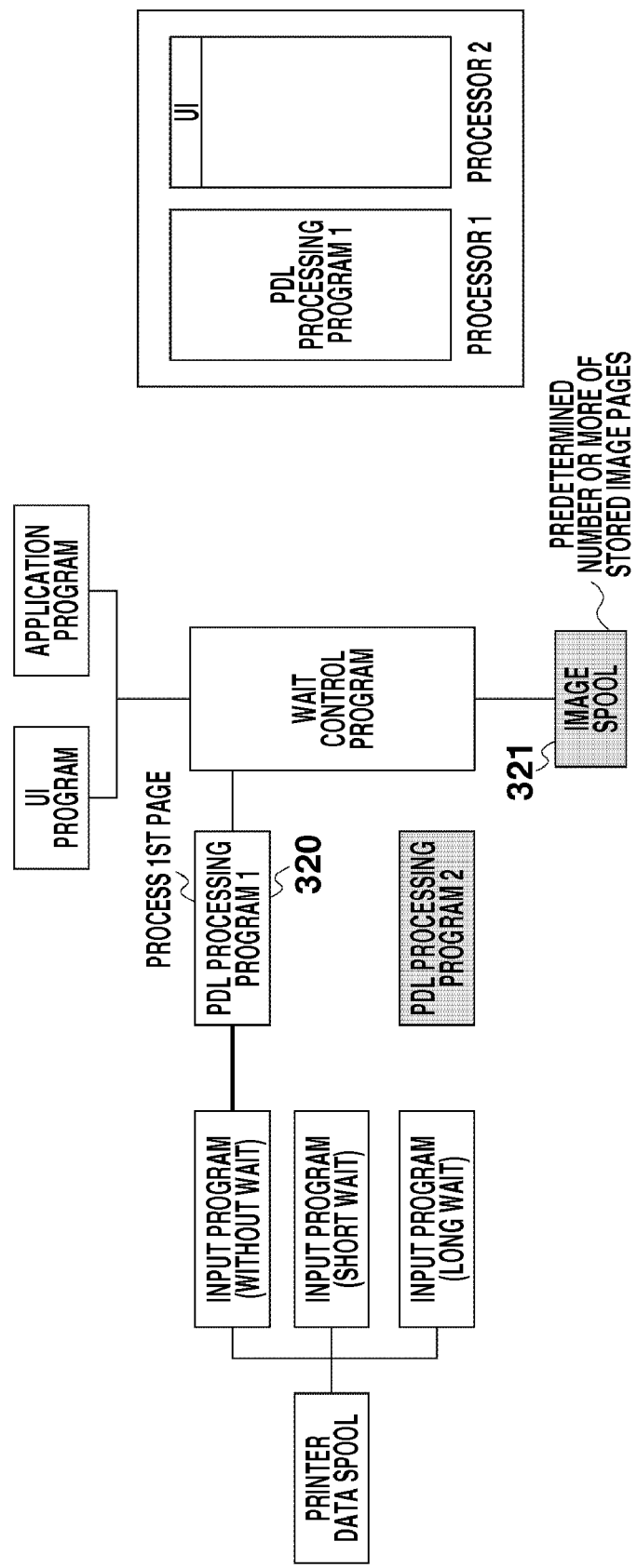

FIG.7
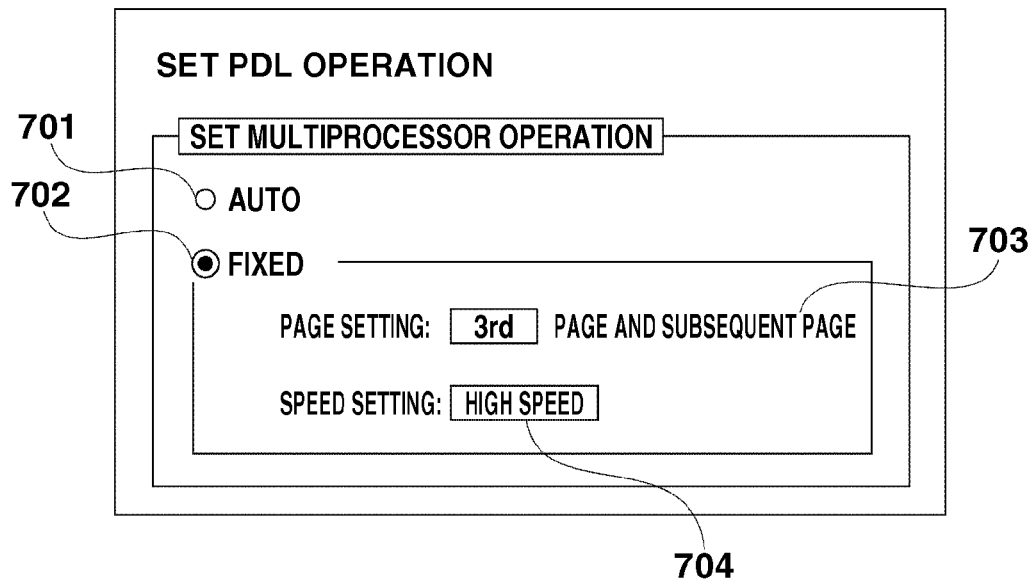
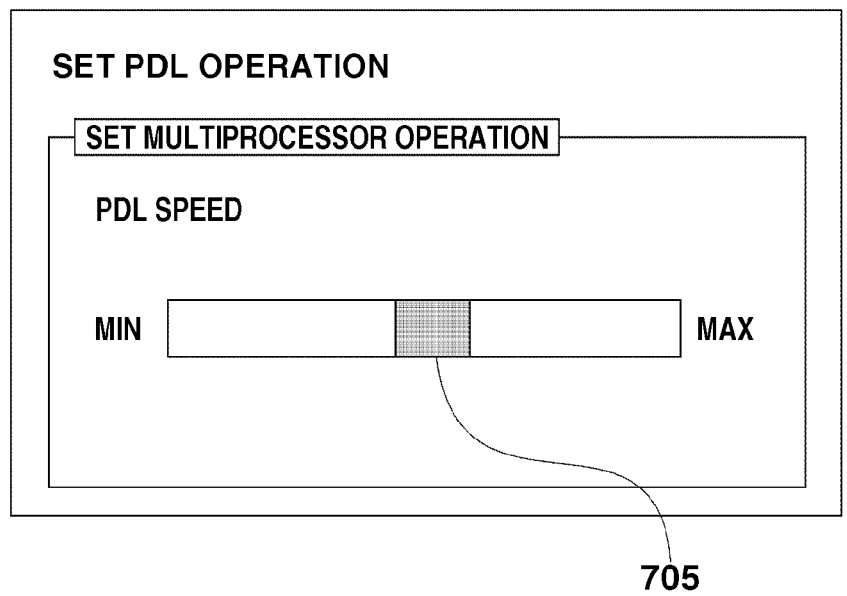

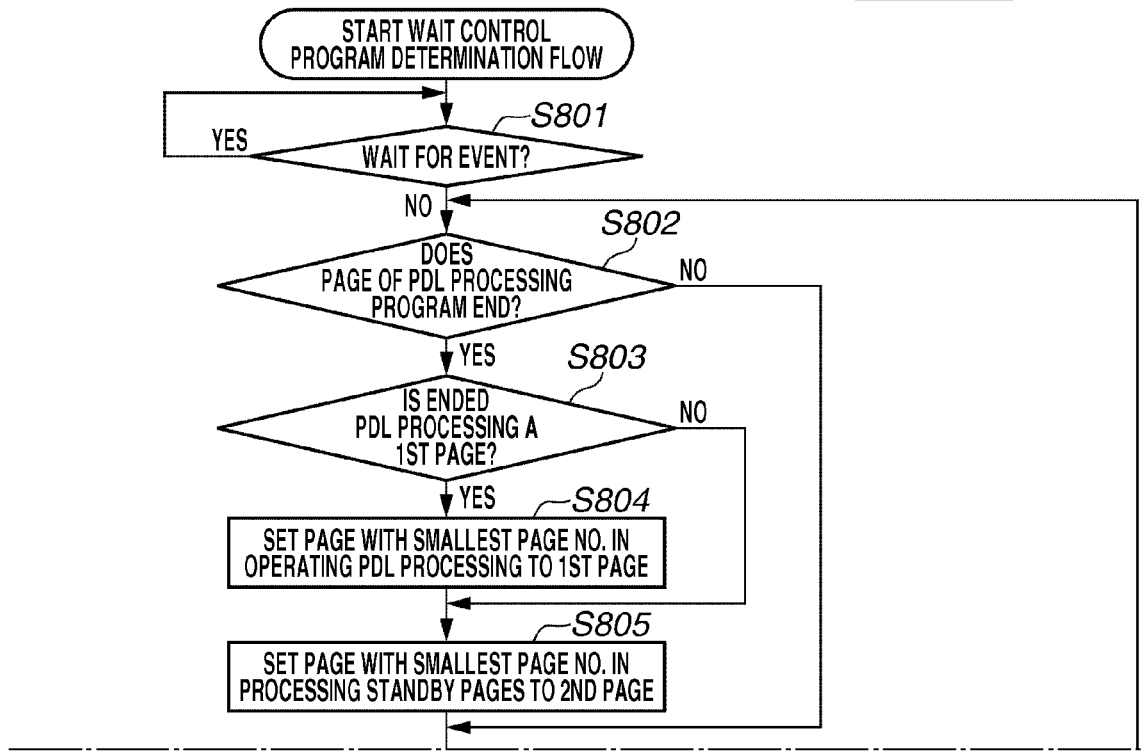

FIG.10
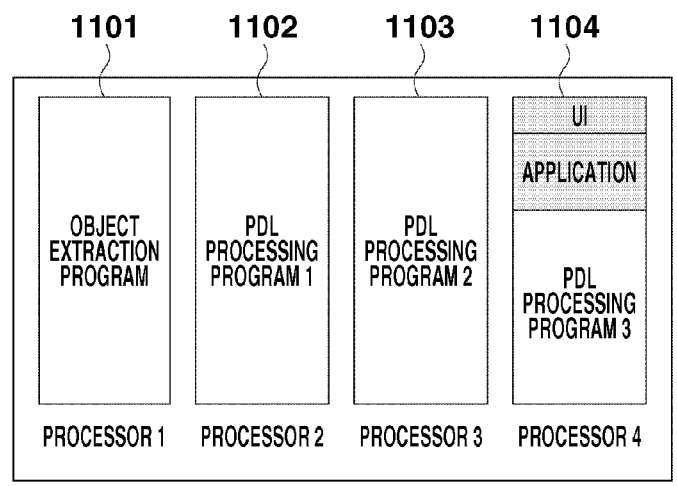
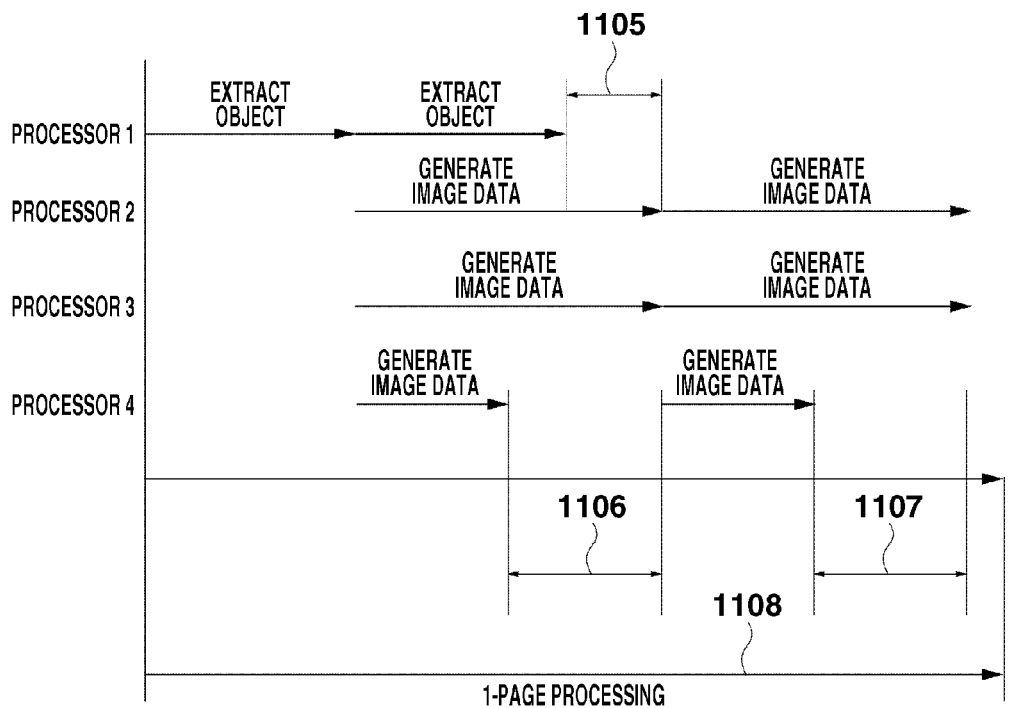

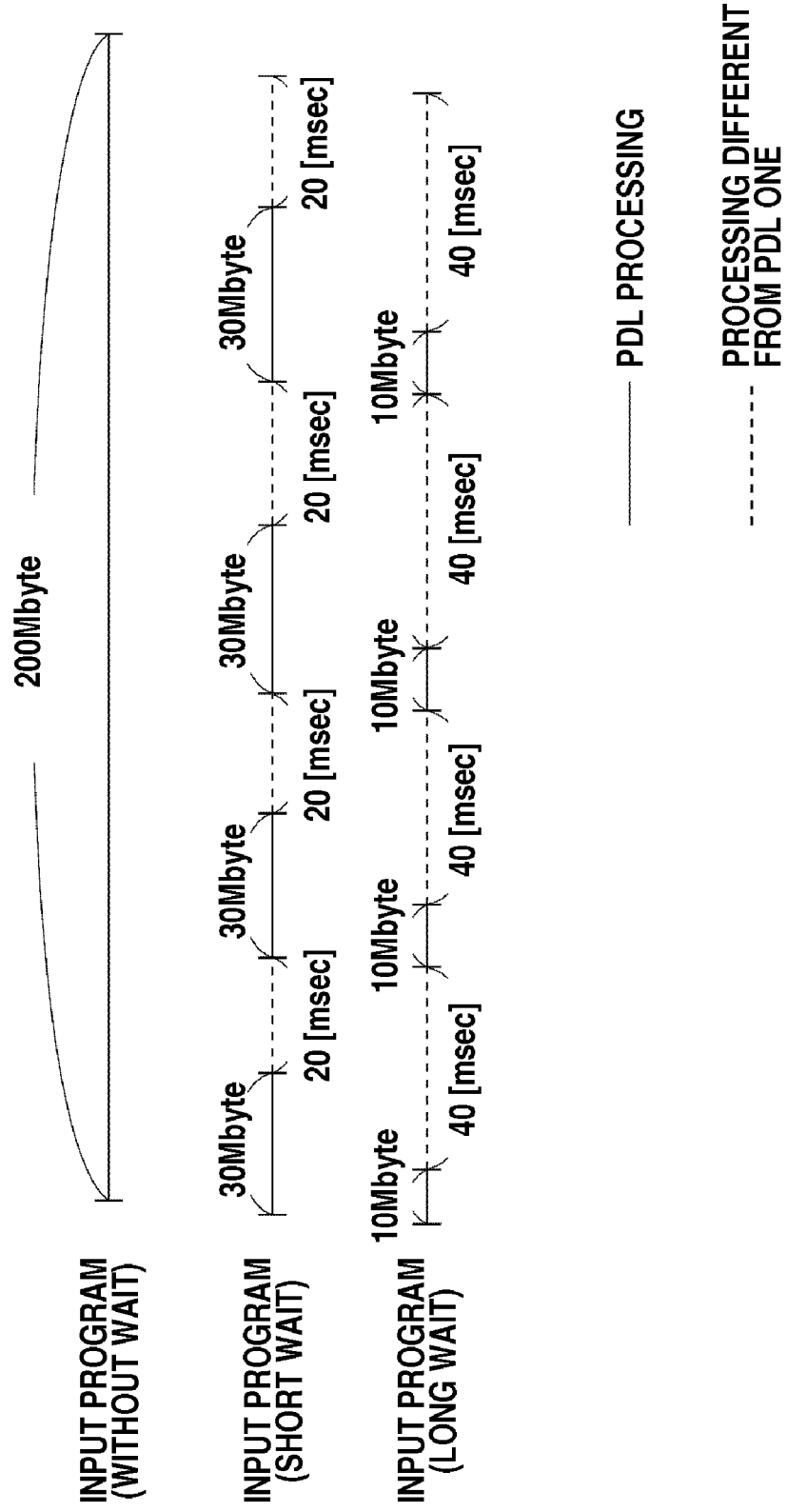

PRINT DATA PROCESSING APPARATUS, PRINT DATA PROCESSING METHOD, AND STORAGE MEDIUM

BACKGROUND OF THE INVENTION

1. Field of the Invention

The present invention relates to a print data processing apparatus, a print data processing method, and a storage medium.

2. Description of the Related Art

In order to suppress power consumption and an operation temperature, there is provided a method for increasing a processing speed by parallel processing with a low-clock multiprocessor, instead of increase in operational clocks of a processor. Recently, an image forming apparatus (e.g., copying machine or a printer) has included a multiprocessor to perform printing processing such as copying or printing without stress.

Japanese Patent Application Laid-Open No. 2007-152623 discusses a method for increasing a speed of printing processing by parallel processing of print data with a multiprocessor in an image forming apparatus capable of performing the printing processing.

SUMMARY OF THE INVENTION

According to an aspect of the present invention, a print data processing apparatus includes a first processor configured to read print data and perform print data processing on the read print data, and a second processor which operates in parallel with the first processor and is configured to stop the print data processing if an instruction to wait is input during the print data processing, to execute processing different from the print data processing if an instruction to execute the different processing is issued by the time the wait is released, and to execute the print data processing if the wait is released.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A to 3C illustrate examples of determining a wait of a page description language (PDL) processing program executed by a multiprocessor.

FIGS. 6A and 6B illustrate examples of determining the wait of the PDL processing program executed by a single processor.

FIG. 7 illustrates a UI screen of the image forming apparatus.

FIG. 10 is a time chart of processors at the time of object parallel processing.

FIG. 11 illustrates processing situations of processors with respective waits.

DESCRIPTION OF THE EMBODIMENTS

Various exemplary embodiments, features, and aspects of the invention will be described in detail below with reference to the drawings.

When a speed of printing processing is increased in an image forming apparatus using a multiprocessor, the printing processing may occupy the multiprocessor. In particular, an operation system (OS) such as Linux does not have a concept of task priority processing, and the possibility of occupation of the multiprocessor is extremely high.

The printing processing that occupies the multiprocessor in the image forming apparatus can trigger the following situations. More specifically, it is not possible to receive an instruction for canceling the printing from a user because of instability of a user interface operation of the image forming apparatus during printing, and cancel control is slowed.

The present invention is directed to execute processing different from printing processing with parallel processing of the printing processing using a multiprocessor in an image forming apparatus provided with the multiprocessor.

Figure 1:
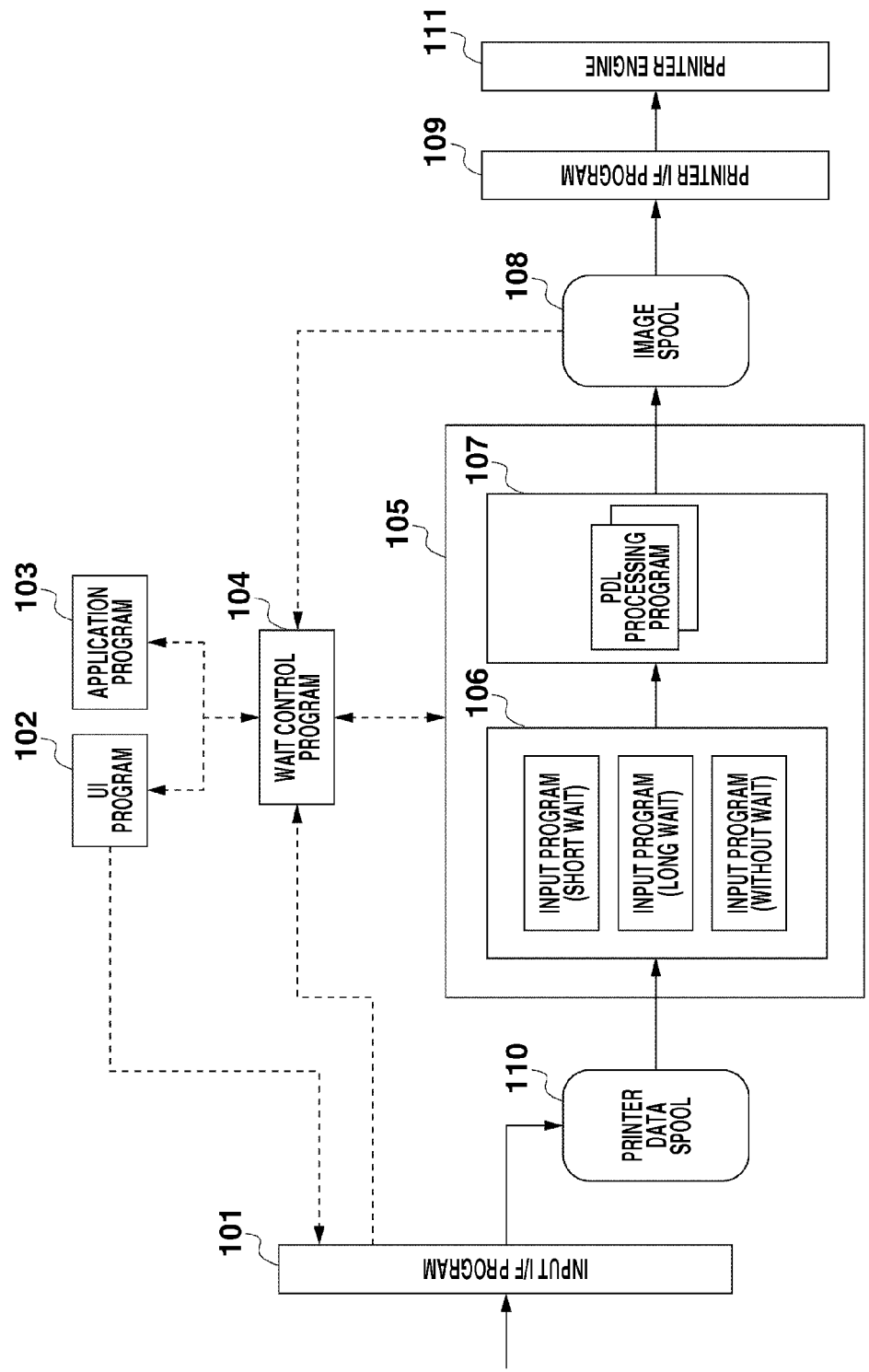
FIG. 1 is a flowchart illustrating an entire flow of an image forming apparatus that performs page parallel processing.
Figure 2:
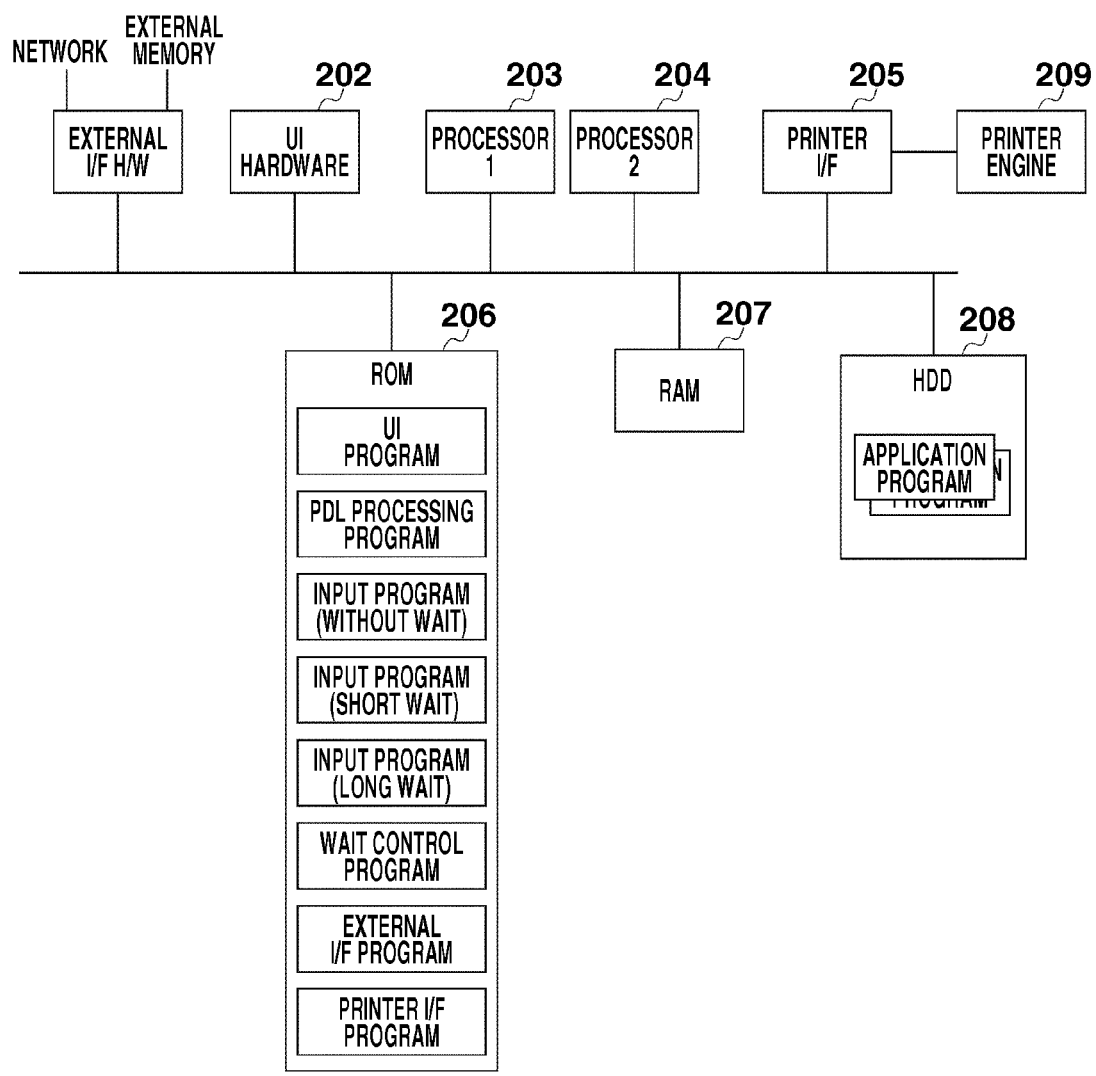
FIG. 2 illustrates a hardware structure of the image forming apparatus that performs page parallel processing.

FIGS. 1 and 2 illustrate an entire flow of the printing processing in the image forming apparatus as a print data processing apparatus. The printing processing corresponds to a series of processing including image formation based on a received page description language (PDL) or general-use document, e.g., portable document format (PDF) and printing or temporary storing of the data. However, the printing processing may not perform a part of the above described processing. Although processing by the image formation based on the received PDL or general-use document is referred to as printing processing, the processing is referred to as print data processing according to an exemplary embodiment of the present invention.

A read-only memory (ROM) 206 in FIG. 2 stores all programs except for an application program illustrated in FIG. 1. When the image forming apparatus is started, the programs are developed in a random access memory (RAM) 207, and are executed by a processor 1 (203) or a processor 2 (204). Further, the programs may be executed by a third processor other than the processors 1 and 2. Upon transmitting PDL data or an electronic document (hereinafter, referred to as print data) via a network from an external memory (a universal serial bus (USB) memory, etc.) or a host personal computer (PC), an input interface (I/F) program 101 stores the print data to a print data spool 110 (a region in the RAM 207 or a hard disk drive (HDD) 208).

An external interface hardware 201 detects the transmission of the print data, and transmits a notification indicating the detection to the (external) input interface program 101. Further, when a user interface (UI) hardware 202 instructs printing of the print data stored in the HDD 208, the input interface program 101 stores the print data to the print data spool 110. One piece of the print data includes a plurality of pages.

The processor that executes the input interface program 101 notifies a wait control program 104 of the transmission of the print data while performing the above storage processing. The processor that executes the wait control program 104 checks the transmission of the print data from the input interface program 101. The processor that executes the wait control program 104 determines states of the UI program 102, the application program 103, an image spool 108, and a PDL processing unit 105.

The processor that executes the wait control program 104 performs an operation not to obstruct operations of the UI program 102 and the application program 103 according to the determination result. More specifically, the processor that executes the wait control program 104 allows programs included in the PDL processing unit 105 to be started on the multiprocessors (203 and 204) in the best states thereof. In the present exemplary embodiment, the processor 203 is a first processor, and the processor 204 is a second processor.

According to the present exemplary embodiment of the present invention, the image forming apparatus includes a hardware (H/W) structure of two processors, i.e., the processor 1 (203) and the processor 2 (204). Therefore, the wait control program 104 can simultaneously start both a PDL data input program 106 and a PDL processing program (print data processing program) 107.

The UI hardware 202 includes an operation panel and an operation screen, and a user can input predetermined data with the operation panel while viewing the operation screen. An input of the user from the UI hardware 202 is transmitted to the UI program 102, so that necessary processing obtained by interpretation of operation contents and an interpretation result can be executed.

The application program 103 is formed by adding an original program to a program that is first provided for the image forming apparatus by a user. For example, the user can add a color conversion program and a trapping program for improving an image quality. The user can generate the application program 103 and store the generated program to a hard disk drive (HDD) 208 in the image forming apparatus via a network or from an external memory. The application program 103 stored in the HDD 208 is developed and executed in the RAM 207 immediately after being stored to the HDD 206 or at the next start time.

The processor that executes the PDL data input program 106 reads the print data from the print data spool 110 and transmits the read print data to a processor that executes a PDL processing program 107. The PDL data input program 106 has an upper limit of an amount of print data that can be read on one operation. In order to read PDL data corresponding to one page, the PDL data input program 106 requires a plurality of times of the reading operation. A wait is added to starting or ending of the one reading operation of the PDL data input program 106, so that a processing speed of the PDL processing program 107 can be adjusted. A length of the wait is adjusted by wait time and the upper limit of the amount of data that can be read once.

If the wait time is long and the upper limit of the amount of data for one-time reading is low, the processor frequently stops the PDL processing program 107. Therefore, the UI program 102 and the application program 103 can easily perform the operation. However, the operation of the PDL processing program 107 is performed at low speed. On the other hand, if there is no wait or if the wait is short and the upper-limit of the amount of data for one-time reading is high, the processor frequently operates the PDL processing program 107. Therefore, the UI program. 102 and the application program 103 cannot be operated and the operation of the PDL processing program 107 is fast.

The PDL processing program 107 interprets data corresponding to one page from the print data, forms an image, and stores the image to the image spool 108 (the region of the RAM 207 or HDD 208). The image stored in the image spool 108 is transmitted to a printer engine 111 (209) and is then printed. When secure print is designated, the image data which is subjected to the print data processing and image formation is not immediately transmitted from the image spool 108 to the printer engine 111 (209). The image data is printed after receiving an instruction from the UI program 102.

How the wait control program 104 starts the PDL data input program 106 and the PDL processing program 107 will be described with reference to FIGS. 3A to 3C to FIGS. 6A and 6B. The start operation is based on the states of the UI program 102, the application program 103, the image spool 108, and the PDL processing unit 105.

Figure 3A:
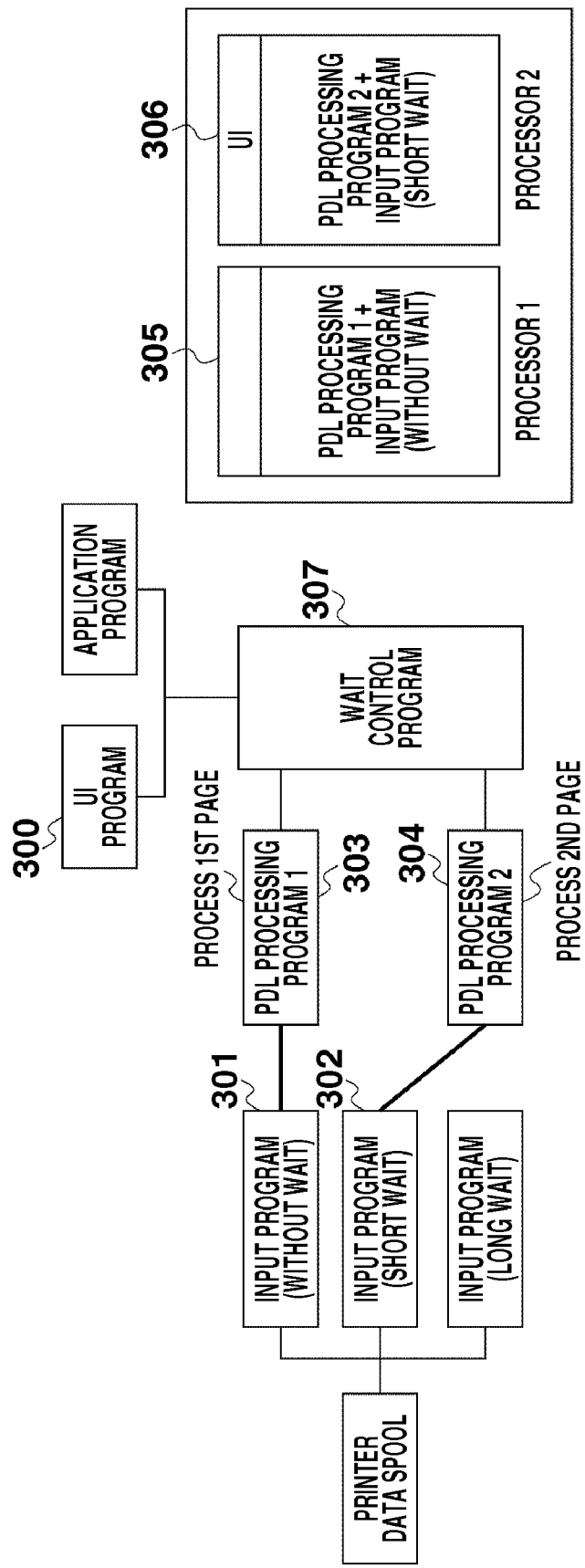
Figure 3C:
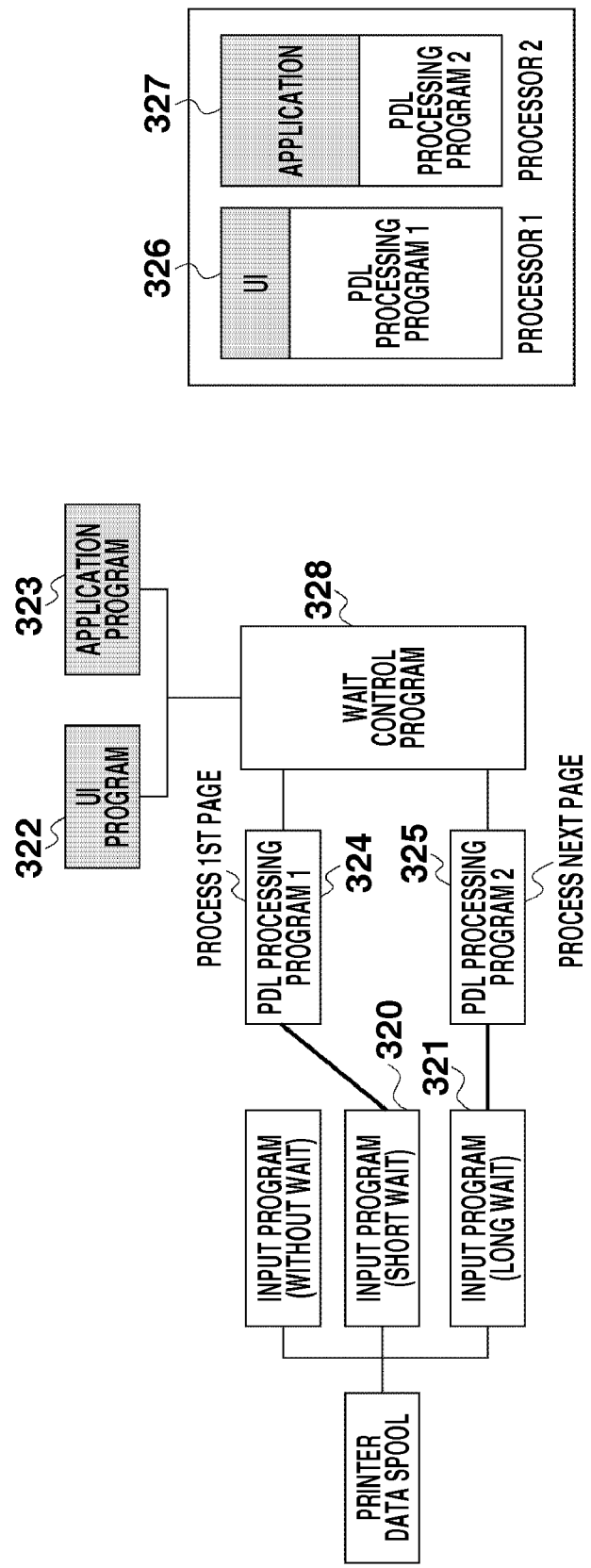

According to the exemplary embodiment of the present invention, it is assumed that the processing of each of the wait control program 104, an external interface program 101, and a printer interface program 109 is lighter than other programs, and is executed by the processor 2 (204). Although the programs may be executed by a processor other than the processor 2 (204), when the processor 1 executes the programs, the PDL processing executed by the processor 1 may be slowed down. FIGS. 3A to 3C illustrate a method for actual page parallel processing of the PDL data input program 106 and the PDL processing program 107 executed by the multiprocessors (203 and 204).

The operation of the processor that executes the PDL data input program 106 will be described. First of all, the PDL data input program is described below. There is a plurality of types of the PDL data input programs and, for example, the PDL data input program 106 in FIG. 1 includes three types of the PDL data input programs without await and with a short wait and a long wait. If the processor executes these three types of the PDL data input programs, it is possible to adjust the time that the processor can execute processing different from the PDL processing and the amount of the print data to be read by the processor at a time. This operation is described below in detail.

First, time during which the processor does not execute the PDL processing is described. There is a method for adding a wait to stop the PDL processing program executed by the processor. Since the processor with the wait is released from the PDL processing, a resource can be assigned to processing different from the PDL processing. As the time for release from the PDL processing, i.e., the wait time, is prolonged, the time for enabling the execution of the processing different from the PDL processing becomes longer corresponding to the prolonging wait time.

The three types of the PDL data input programs in FIG. 1 include different time periods for enabling the execution of the processing different from the PDL processing. More specifically, the PDL data input program without the wait does not provide the wait to the processor, so that processing other than the PDL processing is not executed. Thus, the PDL data input program without the wait cannot execute the processing different from the print data processing until it is released from the PDL processing. As compared to the PDL data input program with the long wait, a time period released from the PDL processing is short in the PDL data input program with the short wait. Therefore, the PDL data input program with the short wait has the shorter time for enabling the execution of the processing different from the PDL processing, as compared with that with the long wait. Accordingly, when the time for enabling the execution of the processing different from the PDL processing is expressed by an inequality, a relation of (long wait)>(short wait)>(without wait) is established.

Next, the amount of the print data that is subjected to the print data processing at one time by the processor is described. The three types of the PDL data input programs in FIG. 1 include different amounts of the print data that is subjected to the print data processing at one time. As compared with the PDL data input program without the wait, the PDL data input program with the short wait includes a smaller amount of the print data for the print data processing at one time. As compared with the PDL data input program with the short wait, the PDL data input program with the long wait includes a smaller amount of the print data for the print data processing at one time. When a relation of the amount of the print data for the print data processing at one time by the processor with respective waits is expressed by an inequality, a relation of (without wait)>(short wait)>(long wait) is established.

Next, the operation of the processor including respective waits is described with reference to FIG. 11. FIG. 11 illustrates an example of the execution of both the print data processing and the processing different from the print data processing by the processor that executes the three types of the PDL data input programs in FIG. 1. In FIG. 11, it is assumed that the amount of PDL data with 1 Mbytes is processed in 1 msec.

The processor that executes the PDL data input program without wait in FIG. 11 performs the print data processing of the amount of the print data with 200 Mbytes for 200 [msec] and does not perform the processing different from the print data processing.

The processor that executes the PDL data input program with the short wait in FIG. 11 performs the print data processing of the amount of the print data with 30 Mbytes in one-time print data processing. Thus, the processor that executes the PDL data input program with the short wait performs the print data processing of the amount of print data with the total 120 Mbytes for 120 [msec] out of 200 [msec]. Further, the processor that executes the PDL data input program with the short wait performs the processing different from the print data processing for 80 [msec] as the remaining time.

The processor that executes the PDL data input program with the long wait in FIG. 11 performs the print data processing of the amount of the print data with 10 Mbytes in one-time print data processing. Thus, the processor that executes the PDL data input program with the long wait performs the print data processing of the amount of the print data with the total 40 Mbytes for 40 [msec] out of 200 [msec]. Further, the processor that executes the PDL data input program with the long wait performs the processing different from the print data processing for 160 [msec] as the remaining time.

As described above, the addition of the wait enables the adjustment of the amount of the print data that is subjected to one-time PDL processing by the processor. By adjusting the amount of the print data, the processor increases or reduces the time for enabling the execution of the processing different from the print data processing. Further, after the processor ends the print data processing, it is possible to increase or reduce the time for enabling the execution of the processing different from the print data processing by adjusting the next timing of the print data processing.

The timing for ending the print data processing and enabling the execution of the processing different from the print data processing is referred to as a first timing. The timing when the wait after the first timing is released and the PDL processing is executed is referred to as a second timing. For example, the first timing of the PDL data input program with the short wait in FIG. 11 corresponds to the timing when the execution of the PDL processing of the amount of the print data with 30 Mbytes is completed, and the second timing of the PDL data input program with the short wait corresponds to the timing after 20 [msec] from the first timing.

FIG. 3A illustrates a situation in which a UI program 300 is in a state waiting for an instruction from the UI hardware 202 and the application program is not operated. In this case, a wait control program 307 causes a PDL processing program 1 (303) to process a first page (a page with the smallest page number among pages whose image data is not generated in the print data). Because, if the print data processing of the first page is not performed at a high speed, the processing of the printer interface 109 is stagnated and the printing may stop. Therefore, the wait control program 307 needs to cause the PDL processing program 1 (303) to operate at high speed, and the PDL processing program 1 (303) is operated by the processor 1 (305) in combination with the PDL data input program (without wait).

Since the processing may advance to some degree during the processing of the first page, the image data of a second page does not need to be generated at high speed. The wait control program 307 causes the PDL processing program 2 (304) to process the second page to enable the UI program 300 to immediately start the operation. Thus the PDL processing program 2 (304) is combined with the PDL data input program 302 (with the short wait) and operated by the processor 2 (306). The wait control program 307 causes the UI program 300 to operate on the processor 2 (306) in a state waiting for an instruction only from the UI hardware 202.

There is a reason why the UI program 300 is always in a state to be ready for the operation. Because a user may feel dissatisfied with or anxious about the following situation. For example, when the user operates the UI hardware 202, the UI program 300 does not immediately operate and the operation screen of the UI hardware 202 is frozen. Although the user wants to cause the image forming apparatus to promptly execute the next job, the operation screen is frozen and the user does not operate the operation screen. The user may feel dissatisfied with the situation. Further, the freeze time is prolonged and the user misunderstands that the image forming apparatus is troubled. The user may worry about the situation. To solve such problems, it is important to set the UI program in an executable state. In particular, such situation may occur notably in an image forming apparatus which uses an operating system that processes with a simple time thread without task priority.

FIG. 3B illustrates a situation in which the user is actually operating the UI hardware 202, a UI program 312 is operated, and the application program is not operated. A wait control program 317 causes a PDL processing program 1 (313) to process the first page (a page with the smallest page number among pages which are included in the print data and whose image data is not generated).

The wait control program 317 needs to cause the PDL processing program 1 (313) to operate at high speed. Therefore, the PDL processing program 1 (313) is combined with the PDL data input program 310 (without wait), and is operated by a processor 1 (315). Since the user is operating the UI hardware 202, the UI program 312 is frequently operated. Thus, it is necessary to increase the wait of the PDL processing program of the second page to process the UI program 312 at high speed. The wait control program 317 causes a processor 2 (316) to operate a PDL processing programs 2 (314) in combination with a PDL data input program 311 (with the long wait).

FIG. 3C illustrates a situation in which the user is actually operating the UI hardware 202, a UI program 322 is operated, and an application program 323 is also operated. Since the application program 323 performs image processing such as color conversion or trapping of the image data, the processing thereof is slower than that of the UI program 322. Therefore, it is necessary to assign the processor processing time of the application program 323 longer than that of the UI program 322.

A wait control program 328 causes a PDL processing program 1 (324) to process the first page. The wait control program 328 needs to cause the PDL processing program 1 (324) to operate at high speed. However, since the UI program 322 needs to be operated at high speed, the UI program is operated by a processor 1(326) in combination with a PDL data input program 320 (with the short wait). The wait control program 328 causes a processor 2 (327) to operate a PDL processing program 2 (325) in combination with a PDL data input program 321 (with the long wait).

As described above, the wait control program 104 controls an operation speed of the PDL processing program 107 to operate the PDL processing program 107 according to a state of the program operated in the image forming apparatus. Thus, the multiprocessors (203 and 204) can operate the PDL processing program 107 at higher speed without obstructing the operations of the UI program 102 and the application program 103.

Figure 4:
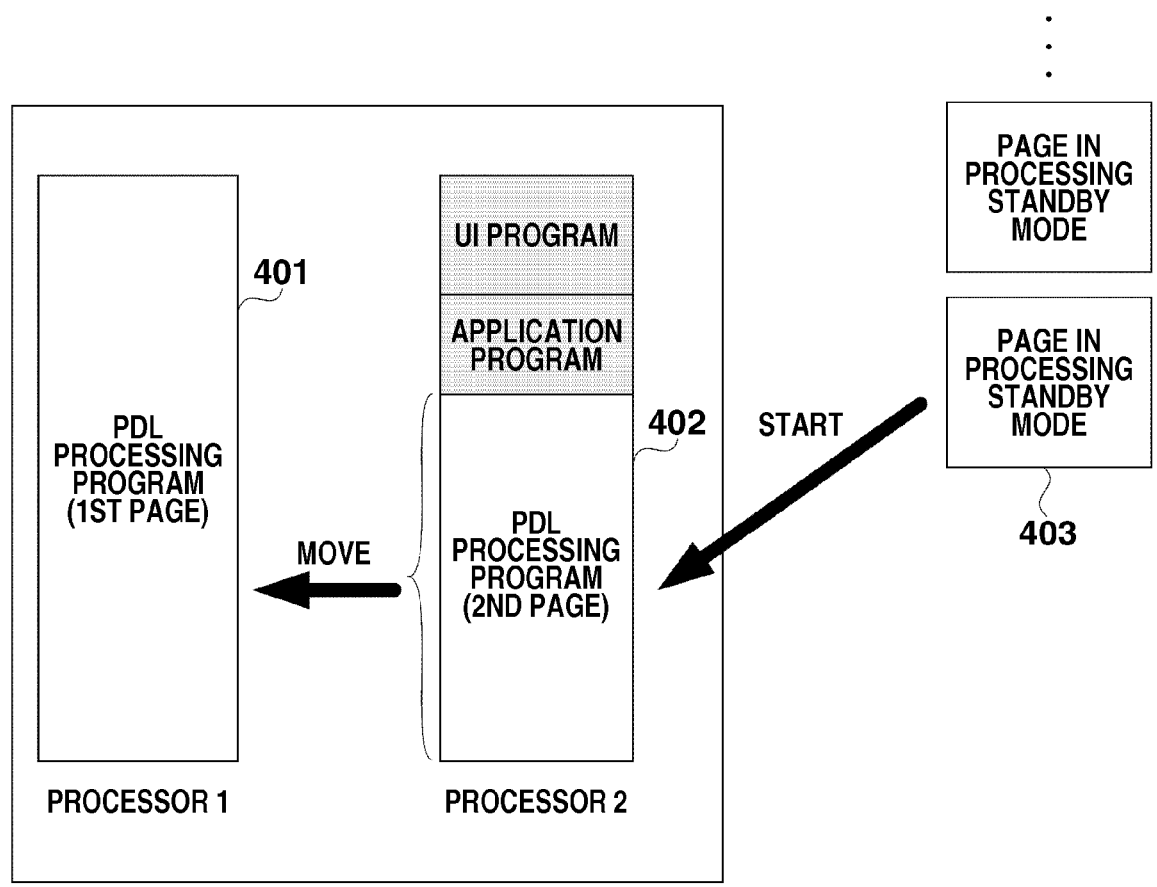
FIG. 4 illustrates a state in which the PDL processing program shifts between processors.

In the description using FIG. 3, upon ending the PDL processing program 107 that processes the first page, the second page processed by the PDL processing program 107 becomes the first page. It is desirable that the PDL processing program 107 which processes the page as the first page changed from the second page can process the page at high speed. Therefore, as illustrated in FIG. 4, when the processing of a first page of a PDL processing program 401 by the processor 1 is completed, the PDL processing program 402 whose second page is processed by the processor 2 is changed to be processed by the processor 1. Further, it is changed that the processor 2 processes a first page 403 among pages which are not yet subjected to image data generation. At this time, the processors need to receive and transmit the operation of the programs therebetween.

Figure 5A:
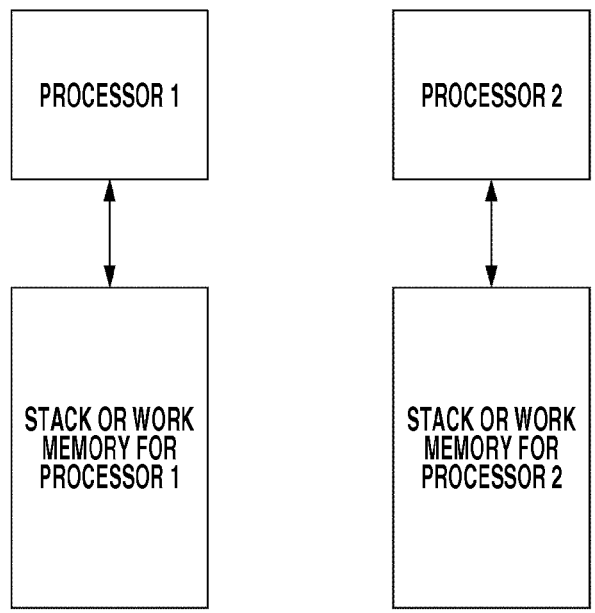
FIGS. 5A and 5B illustrate a relation between resources for operation of the program.
Figure 5B:
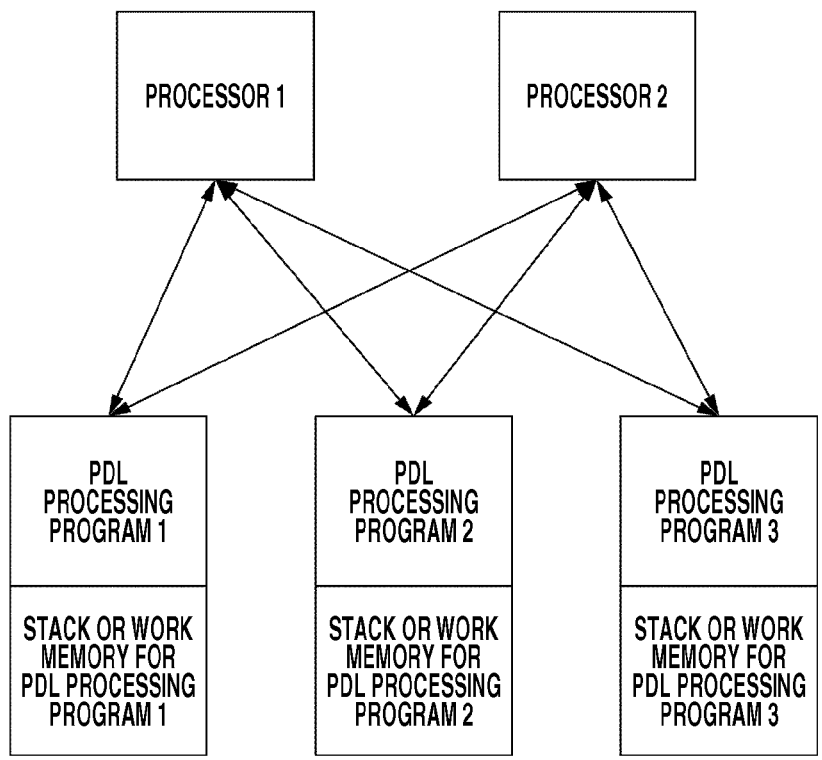

As illustrated in FIG. 5A, if resources, such as a necessary stack or work memory to operate the PDL processing program 107, is assigned depending on the processors, the operation of the programs cannot move between the processors. In order to apply the present invention, it is required to manage the resources such as a necessary stack or work memory to operate each of the PDL processing programs 107 as illustrated in FIG. 5B.

A first processor that ends the print data processing of a first page can execute the print data processing of the print data of a second page. For example, if the first processor ends the print data processing of the first page, and a second processor performs the print data processing of the second page.

In this case, according to the first exemplary embodiment, the first processor processes the second page. The second processor processes the second page, and the first processor processes a third page. However, the second processor that processes the second page serving as the first page also executes the processing different from the print data processing, and the entire printing processing is slowed. However, if such effect is not desired, this structure may be used.

FIGS. 6A and 6B illustrate a case in which the multiprocessors (203 and 204) do not operate with page parallel processing with the exception of the PDL data input program 106 and the PDL processing program 107.

FIG. 6A illustrates a state in which a plurality of UI programs 602 and application programs 603 operate. In this state, it is assumed that only one processor cannot perform the processing different from the print data processing by ensuring a sufficient speed. In this case, a PDL processing program 601 may process only the first page.

As a method for determining whether the sufficient speed is ensured, statuses of the resources of the processor maybe checked upon executing the processing different from the print data processing. For example, if a half or more of the resources are used, it may be determined that the UI screen cannot be displayed, and a method for performing the PDL processing by a single processor can be considered.

As illustrated in FIG. 6B, when image data corresponding to a plurality of pages is stored in the image spool 108, the subsequent image data does not need to be generated at high speed. Therefore, a PDL processing program 320 may process only the first page.

FIG. 7 illustrates a UI screen for setting an operation of the wait control program 104. The UI screen is displayed on the UI hardware 202. In an auto setting 701, as described above with reference to FIGS. 3A to 3C to FIGS. 6A and 6B, the wait control program 104 determines the operation situation of the program in the image forming apparatus, and automatically sets the operation speed of the PDL processing program 107. A fixed setting 702 is used when a user wants to set a fixed operation speed, irrespective of the auto setting by the wait control program 104. This is because the user who frequently uses a printing function may desire to always perform the printing processing at high speed, and a user who frequently uses a copying function may desire to comfortably perform the UI operation.

According to the present exemplary embodiment of the present invention, the first page is processed at high speed and the second or subsequent page is performed at low speed, thereby operating the PDL processing program at high speed while allowing another program to operate without obstruction. Therefore, as illustrated by a portion 703, a UI screen is desirable to be able to set a speed of an N-th or subsequent page. In a case of a setting 705 with a tool bar, when a minimum level of the tool bar is designated, one processor may operate the PDL processing program without executing the page parallel processing.

When an intermediate level of the tool bar is designated, the processor 1 may process the first page of the PDL processing program without wait, and the processor 2 may process the second page thereof with the long wait. Further, when near the maximum level of the tool bar is designated, it may be set that the processor 1 processes the first page of the PDL processing program without wait and the processor 2 processes the second page thereof with the short wait.

Figure 8B:
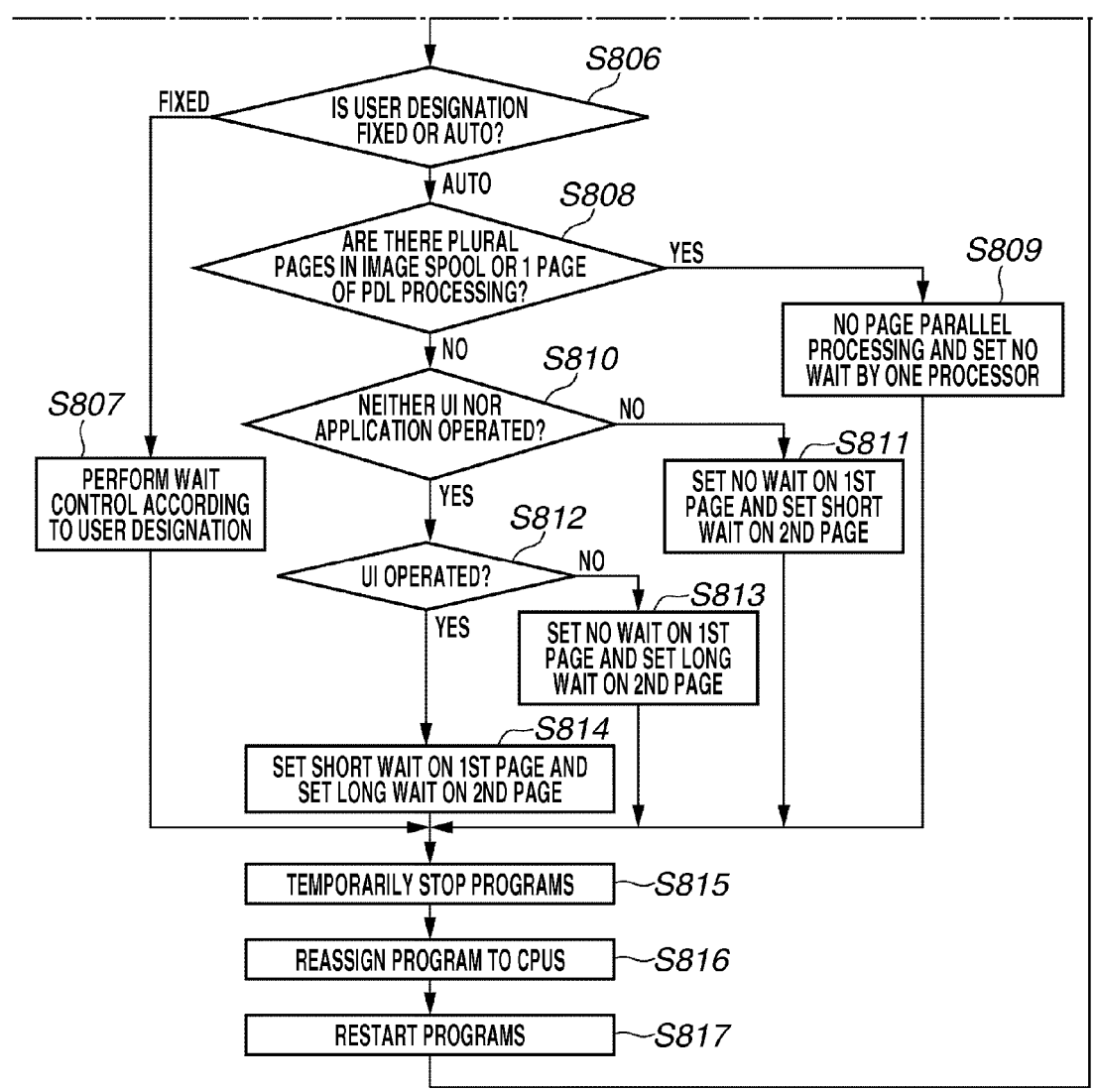
FIG. 8 is a flowchart of a wait control program.

A flow of specific processing of the wait control program 104 is described with reference to FIG. 8. All pieces of processing illustrated in a flowchart in FIG. 8 corresponds to processing of the wait control program 104, are developed from the ROM 206 to the RAM 207 at the start time of the image forming apparatus, and are executed by the processor 2 (204).

In step S801, the wait control program 104 waits until a predetermined event is transmitted thereto. The predetermined event includes transmission of new print data from the external interface program 101, completion of processing of one page of the PDL processing program 107, operation of the UI, a new start of the application program, and the like.

In step S802, the wait control program 104 determines whether the page processing of any of the PDL processing programs 107 ends. When the page processing of any of the PDL processing programs 107 ends (YES in step S802), then in step S803, the wait control program 104 determines whether the ended page is the first page.

When the ended page is the first page (YES in step S803), the processing proceeds to step S804. In step S804, the wait control program 104 sets the PDL processing program 107 in the operation to process the first page, and also in step S805, the wait control program 104 sets the page included in the print data which is not yet subjected to the image data generation to the second page.

When the ended page of the page processing of the PDL processing program 107 is not the first page (NO in step S803), then in step S805, the wait control program 104 only sets the page included in the print data which is not yet subjected to the image data generation to the second page.

Next in step S806, the wait control program 104 acquires a value set by the user using the UI screen and determines whether the wait is determined by a fixed value set by the user or is automatically determined with the operation state of the program in the image forming apparatus. The value set by the user using the UI screen is stored to the RAM 207, and the wait control program 104 obtains the setting by extracting the value from the RAM 207.

When the wait is to be determined by the fixed value (FIXED in step S806), in step S807, the wait control program 104 sets the wait of the PDL processing programs 107 in response to the designation of the user. When the wait is automatically determined (AUTO in step S806), the wait control program 104 automatically determines the wait of the PDL processing program 107 from the operation state of the program in the image forming apparatus as illustrated in a flow in steps S808 to S813.

When the image spool 108 stores the image data in page unit corresponding to a plurality of pages, or the page included in the print data is one page (YES in step S808), the processing proceeds to step S809 and the following operation is performed. In step S809, the wait control program 104 does not perform the page parallel processing but sets the operation without wait by one processor.

If the UI program 102 is in a state waiting for an input from the UI hardware 202 and the application program 103 is not operated (YES in step S810), then in step S811, the wait control program 104 sets the operation of the first page without wait and the operation of the second page with the short wait.

When only the UI program 102 is operated (NO in step S812), then in step S813, the wait control program 104 sets the operation of the first page without wait and the operation of the second page with the long wait.

When the UI program 102 and the application program 103 are operated (YES in step S812), then in step S814, the wait control program 104 sets the operation of the first page with the short wait and the operation of the second page with the long wait.

By the above processing, the wait in the PDL processing program 107 is determined. Therefore, in step S815, the wait control program 104 temporarily stops the PDL processing programs 107, in step S816, shifts the program between the processors if necessary, and in step S817, restarts the programs.

According to the first exemplary embodiment, the method for processing a plurality of pages included in the print data on the multiprocessor with the page parallel processing is described. According to a second exemplary embodiment of the present invention, a method for object parallel processing for parallel processing of a plurality of objects included in a page by the multiprocessor is described. The object means a character, a graphic, and image data.

Figure 9:
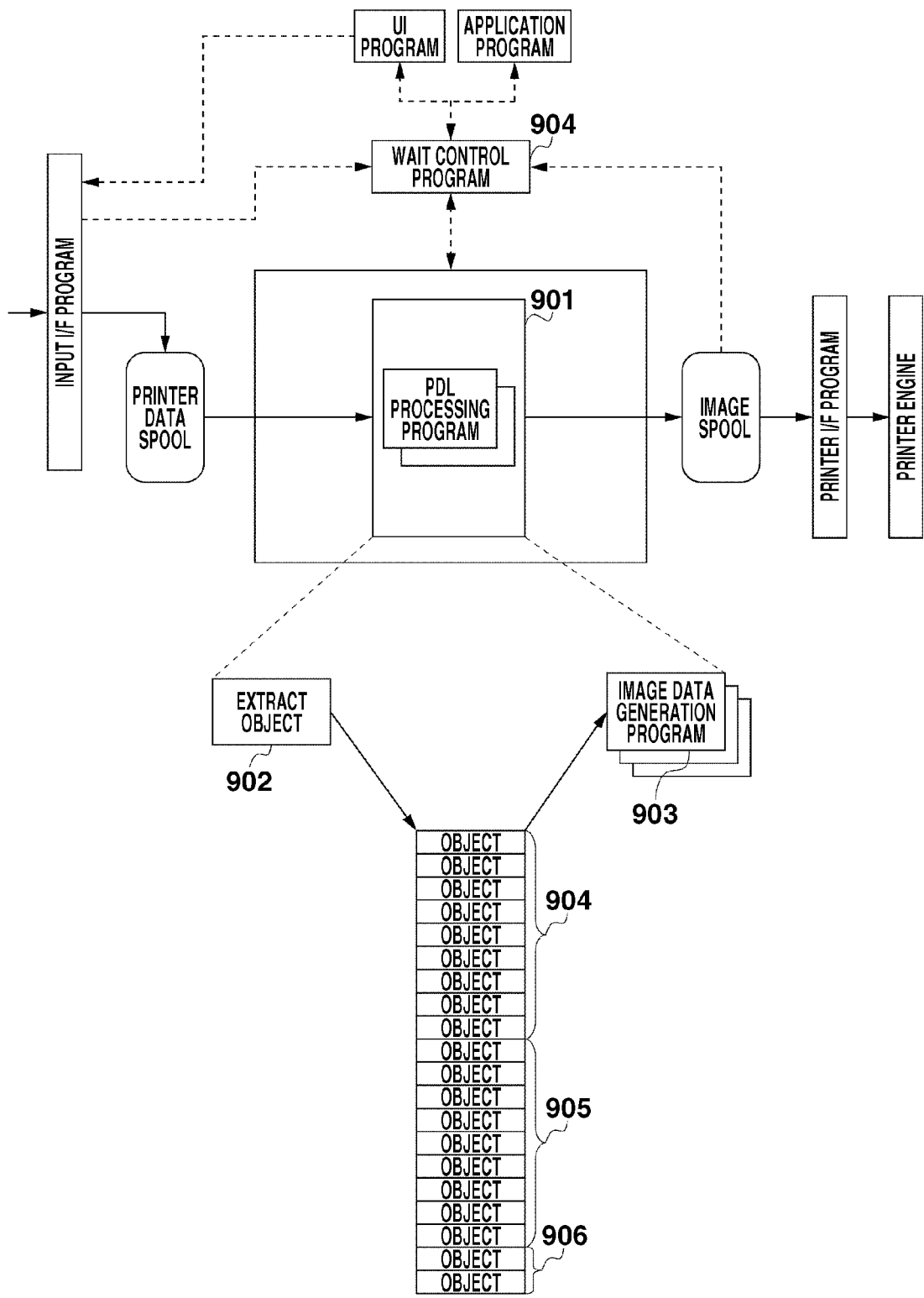
FIG. 9 is a flowchart illustrating an entire flow of an image forming apparatus that performs object parallel processing.

As illustrated in FIG. 9, in parallel processing of the objects, a PDL processing program 901 includes an object extraction program 902 and an image data generation program 903. The object extraction program 902 and the image data generation program 903 are stored in a ROM 1001, are developed in a RAM 1006 at the start time, and are executed by each of processors 1002, 1003, 1004, and 1005. The object extraction program 902 operated by the processor 1 (1002) extracts objects 904, 905, and 906 included in the page of the print data, and stores the extracted objects to a RAM 1010.

The extracted objects are divided into object groups 904, 905, and 906 so as not to cause an error of the image data in the parallel processing. An error of the image data depends on overlapping of the objects. Therefore, the object extraction program 902 sorts the objects to a Y-axis or a Z-axis of an image formation coordinate and then divides the sorted objects.

The processor 2 (1003), the processor 3 (1004), and the processor 4 (1005) perform the print data processing of the respective object groups. The image data generation program 903 forms images of the respective object groups, stores the image data in the image spool 108, and prints out the image data via a printer interface.

The wait control program 904 differentiates the number of objects in each object group when dividing the objects into the object groups, and causes the processors to execute the processing of the image data generation program 903. Since the print data processing executed in the image data generation program 903 which is allocated a small number of objects is reduced, the image data generation program 903 can finish the processing earlier than other image data generation programs 903 and enter a wait state. When the image data generation program 903 enters the wait state, the UI program and the application program can be operated.

Similar to the first exemplary embodiment, the wait control program 904 controls the wait in the image data generation program by adjusting the number of objects to be divided into the object groups based on the operation state of the programs in the image forming apparatus.

The present exemplary embodiment can be applied to the object parallel processing with the above described processing. Referring to FIG. 10, a processor 1 (1101) causes the object extraction program 902 to operate. Processors 2 to 4 (1102 to 1104) cause the image data generation programs 903 to operate. When the processor 4 (1104) causes the UI program or the application program to operate, the processor 4 processes a small number of objects to cause the image data generation program 903 to operate with wait.

With reference to a time chart illustrated in FIG. 10, since the image data generation program 903 does not operate between an interval 1106 and an interval 1107, the UI program and the application program can operate. The objects are extracted from the entire page processing 1108 at a plurality of times because it is necessary to add the wait frequently like the intervals 1106 and 1107 to enable the UI program to promptly operate.

As described in the first exemplary embodiment, if it takes a long time from the operation of the UI hardware by the user to the reaction of the UI program, the user does not comfortably use the program. Thus, the objects are extracted at a plurality of times with the frequent addition of the wait. Therefore, at an interval 1105, the image data generation program 903 in the processor 3 can already perform the operation. However, the image data generation program 903 in the processor 3 may wait for the operation until ending the operation of the image data generation program 903 in the processor 2 or the processor 3.

According to the exemplary embodiments of the present invention, the amount of print data processed at a time in the PDL data input program with the short wait is larger than the amount of print data processed at a time in the PDL data input program with the long wait. Further, the time for release from the PDL processing in the PDL data input program with the short wait is shorter than the time for release from the PDL processing in the PDL data input program with the long wait.

In other words, according to the exemplary embodiments of the present invention, in order to enable the PDL data input program with the short wait to process the processing different from the print data processing, the time for the print data processing is set shorter in both the conditions of the amount of print data processed at one time and the time for release from the PDL processing, compared with the PDL data input program with the long wait. However, one of the conditions may be established. However, after completing the entire processing, the processor that executes the PDL data input program with the short wait requires the PDL processing time longer than that of the processor that executes the PDL data input program with the long wait.

According to the exemplary embodiments of the present invention, the PDL data input program 106 and the PDL processing program 107 are individual programs. However, the PDL processing program 107 may include the PDL data input program 106 in advance.

According to the exemplary embodiments of the present invention, the number of central processing units (CPUs) in the image forming apparatus is two. However, the present invention can be applied to an apparatus which includes at least one CPU. Further, a CPU may include a plurality of core processors. In this case, each core processor processes one thread. The core processor is an aggregate which operates in combination with a command issuing device, an operator, and the like in the processor.

Aspects of the present invention can also be realized by a computer of a system or apparatus (or devices such as a CPU or MPU) that reads out and executes a program stored on a memory device to perform the functions of the above-described embodiment(s), and by a method, the steps of which are performed by a computer of a system or apparatus by, for example, reading out and executing a program stored on a memory device to perform the functions of the above-described embodiment(s). For this purpose, the program is provided to the computer for example via a network or from a storage medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-219222 filed Sep. 24, 2009, which is hereby incorporated by reference herein in its entirety.

What is claimed is:

1. A print data processing apparatus comprising:
a first processor configured to read print data and perform print data processing on the read print data; and
a second processor which operates in parallel with the first processor and is configured to stop the print data processing if an instruction to wait is input during the print data processing, to execute processing different from the print data processing if an instruction to execute the different processing is issued by the time the wait is released, and to execute the print data processing if the wait is released,
wherein the second processor is a processor which executes a wait program and is configured to read the print data, perform the print data processing on print data with a predetermined size, and then add the wait,
wherein the second processor is a processor which executes the wait program, and timings for adding the wait and releasing the wait are determined in the wait program, and
wherein the first processor executes only the print data processing, and the first processor reads print data of a first page, which is a page with a smallest page number among pages included in the print data which have not been subjected to the print data processing, and executes the print data processing on the read print data of the first page, and the second processor reads print data of a second page, which is a next page of the first page, and executes the print data processing on the read print data of the second page.

2. The print data processing apparatus according to claim 1, wherein, to perform the print data processing of a plurality of objects included in one page of the print data, both the first processor and the second processor execute the print data processing on the objects that the processors respectively deal with.

3. The print data processing apparatus according to claim 2, wherein, if a plurality of pages of a page unit of data which is generated by the print data processing is stored in a spool, the first processor reads the print data, and executes the print data processing to the read print data, and the second processor is set in a state to be able to execute processing different from the print data processing.

4. The print data processing apparatus according to claim 3, wherein the processing different from the print data processing includes processing for displaying a user interface or image processing to be performed on image data generated based on the print data.

5. A method for processing print data, the method comprising:
causing a first processor to read print data and perform print data processing on the read print data; and
causing a second processor which operates in parallel with the first processor to stop the print data processing if an instruction to wait is input during the print data processing, to execute processing different from the print data processing if an instruction to execute the different processing is issued by the time the wait is released, and to execute the print data processing if the wait is released,
wherein the second processor is a processor which executes a wait program and is configured to read the print data, perform the print data processing on print data with a predetermined size, and then add the wait,
wherein the second processor is a processor which executes the wait program, and timings for adding the wait and releasing the wait are determined in the wait program, and
wherein the first processor executes only the print data processing, and the first processor reads print data of a first page, which is a page with a smallest page number among pages included in the print data which have not been subjected to the print data processing, and executes the print data processing on the read print data of the first page, and the second processor reads print data of a second page, which is a next page of the first page, and executes the print data processing on the read print data of the second page.

6. A non-transitory computer-readable storage medium storing a program for causing a computer to execute the method according to claim 5.

* * * * *